US011347902B2

(12) United States Patent
Bush et al.

(10) Patent No.: US 11,347,902 B2
(45) Date of Patent: May 31, 2022

(54) DEFENSIVE ROUTING AND RELATED TECHNIQUES

(71) Applicant: Massachusetts Institute of Technology, Cambridge, MA (US)

(72) Inventors: Kevin B. Bush, Sudbury, MA (US); Matthew D. Hicks, Blacksburg, VA (US); Timothy D. Trippel, Mishawaka, IN (US)

(73) Assignee: Massachusetts Institute of Technology, Cambridge, MA (US)

( * ) Notice: Subject to any disclaimer, the term of this patent is extended or adjusted under 35 U.S.C. 154(b) by 459 days.

(21) Appl. No.: 16/598,293

(22) Filed: Oct. 10, 2019

(65) Prior Publication Data

US 2020/0151368 A1 May 14, 2020

Related U.S. Application Data

(60) Provisional application No. 62/801,698, filed on Feb. 6, 2019, provisional application No. 62/792,012, filed
(Continued)

(51) Int. Cl.
*G06F 21/86* (2013.01)
*G06F 21/87* (2013.01)
(Continued)

(52) U.S. Cl.
CPC .............. *G06F 21/86* (2013.01); *G06F 21/56* (2013.01); *G06F 21/70* (2013.01); *G06F 21/71* (2013.01);
(Continued)

(58) Field of Classification Search
CPC .......... G06F 21/86; G06F 21/56; G06F 21/70; G06F 21/71; G06F 21/73; G06F 21/87;
(Continued)

(56) References Cited

U.S. PATENT DOCUMENTS 6,251,773 B1 6/2001 Hartswick et al.
9,946,899 B1 * 4/2018 Wesson ................. H01L 23/576
(Continued)

OTHER PUBLICATIONS

Notice of Allowance dated Aug. 27, 2020 for U.S. Appl. No. 16/597,013; 15 Pages.
(Continued)

*Primary Examiner* — Ayoub Alata
(74) *Attorney, Agent, or Firm* — Daly, Crowley, Mofford & Durkee, LLP

(57) ABSTRACT

Techniques are disclosed for defensive routing of guard wires for security-critical wires in an integrated circuit (IC). Defensive routing provides a routing-centric and preventive layout-level defense against IC fabrication time attacks against security-critical wires within an IC. An example methodology implementing the techniques includes identifying at least one security-critical wire in an IC design, identifying at least one unblocked surface of the identified at least one security-critical wire, and guarding the identified at least one surface of the identified at least one security-critical wire with a guard wire. In one example, the guard wire may be a natural guard wire. In another example, the guard wire may be a synthetic guard wire.

20 Claims, 6 Drawing Sheets

Related U.S. Application Data on Jan. 14, 2019, provisional application No. 62/767,288, filed on Nov. 14, 2018.

(51) Int. Cl.

| | |
|---|---|
| *H01R 43/28* | (2006.01) |
| *H01L 23/00* | (2006.01) |
| *H01L 23/538* | (2006.01) |
| *H01L 23/498* | (2006.01) |
| *H01L 23/552* | (2006.01) |
| *G06F 21/71* | (2013.01) |
| *G06F 21/73* | (2013.01) |
| *G06F 21/88* | (2013.01) |
| *G06F 21/70* | (2013.01) |
| *H04L 9/40* | (2022.01) |
| *H04L 9/00* | (2022.01) |
| *H04N 21/442* | (2011.01) |
| *G06F 21/56* | (2013.01) |
| *H04M 3/22* | (2006.01) |
| *H04W 12/128* | (2021.01) |

(52) U.S. Cl.
CPC ............... *G06F 21/73* (2013.01); *G06F 21/87* (2013.01); *G06F 21/88* (2013.01); *H01L 23/49822* (2013.01); *H01L 23/49838* (2013.01); *H01L 23/5386* (2013.01); *H01L 23/552* (2013.01); *H01L 23/576* (2013.01); *H01R 43/28* (2013.01); *H04L 9/002* (2013.01); *H04L 29/06877* (2013.01); *H04L 63/14* (2013.01); *H04L 63/145* (2013.01); *H04L 63/1441* (2013.01); *H04M 3/2281* (2013.01); *H04N 21/44236* (2013.01); *H04W 12/128* (2021.01); *H01L 2224/05568* (2013.01); *Y10S 707/952* (2013.01)

(58) Field of Classification Search
CPC .................. G06F 21/88; H04W 12/128; H01L 23/49822; H01L 23/49838; H01L 23/5386; H01L 23/552; H01L 23/576; H01L 2224/05568; H01R 43/28; H04L 9/002; H04L 29/06877; H04L 63/14; H04L 63/1441; H04L 63/145; H04M 3/2281; H04N 21/44236; Y10S 707/952

See application file for complete search history.

(56) References Cited

U.S. PATENT DOCUMENTS

| | | | |
|---|---|---|---|
| 10,573,605 B2* | 2/2020 | Tehranipoor | G06F 21/87 |
| 2003/0218475 A1 | 11/2003 | Gammel | |
| 2007/0061770 A1* | 3/2007 | Kobayashi | H01L 24/06 716/113 |
| 2008/0244749 A1* | 10/2008 | Derouet | G06F 21/87 726/25 |
| 2008/0313746 A1* | 12/2008 | Doi | H01L 27/02 257/E27.009 |
| 2010/0031064 A1 | 2/2010 | Walmsley | |
| 2011/0002528 A1 | 1/2011 | Bajura et al. | |
| 2011/0026806 A1 | 2/2011 | Bernstein et al. | |
| 2012/0033810 A1 | 2/2012 | Devadas et al. | |
| 2013/0312122 A1 | 11/2013 | Arora et al. | |
| 2016/0098561 A1 | 4/2016 | Keller et al. | |
| 2017/0148667 A1* | 5/2017 | Lee | H01L 21/76843 |
| 2018/0211377 A1 | 7/2018 | Bahgat Shehata et al. | |
| 2020/0266150 A1 | 8/2020 | Kim et al. | |

OTHER PUBLICATIONS

Preliminary Amendment filed on Oct. 10, 2019 for U.S. Appl. No. 16/597,013; 3 Pages.

PCT International Preliminary Report dated May 27, 2021 for International Application No. PCT/US2019/058254; 5 pages.

PCT International Preliminary Report dated May 27, 2021 for International Application No. PCT/US2019/058255; 8 pages.

Adato et al., "Rapid Mapping of Digital Integrated Circuit Logic Gates via Multi-Spectral Backside Imaging;" Article from Physics Optics (arXiv:1605.09306v1); May 30, 2016; 24 Pages.

Agrawal et al., "Trojan Detection using IC Fingerprinting;" IEEE Symposium on Security and Privacy (SP'07); May 20, 2007; 15 Pages.

Ba et al., "Hardware Trojan Prevention using Layout-Level Design Approach;" 2015 European Conference on Circuit Theory and Design (ECCTD); Aug. 24, 2015; 4 Pages.

Ba et al., "Hardware Trust through Layout Filling: a Hardware Trojan Prevention Technique;" IEEE Computer Society Annual Symposium on VLSI; Jul. 19, 2016; 6 Pages.

Balasch, "Electromagnetic Circuit Fingerprints for Hardware Trojan Detection;" 2015 IEEE International Symposium on Electromagnetic Compatibility (EMC); Aug. 16, 2015; 6 Pages.

Beaumont et al., Hardware Trojans—Prevention, Detection, Countermeasures (A Literature Review); DSTO-TN-1012; Defence Science and Technology Organisation Edinburgh (Australia) Command Control Communications and Intelligence Division; Jul. 2011; 50 Pages.

Becker et al., "Stealthy Dopant-Level Hardware Trojans;" Journal of Cryptographic Engineering, vol. 4, No. 1; Aug. 20, 2013; pp. 19-31; 18 Pages.

C.D. Systems, "Layer Map Files;" Retrieved from http://www-bsac.eecs.berkely.edu/~cadence/tools/layermap.html on May 10, 2019; 1 Pages.

C.D. Systems, "LEF/DEF Language Reference;" Product Version 5.7, Retrieved from http://www.ispd.cc/contests/14/web/doc/lefdefref.pdf; Nov. 2009; 414 Pages.

Cakir et al., "Hardware Trojan Detection for Gate-level ICs Using Signal Correlation Based Clustering;" Proceedings of the Design, Automation & Test in Europe Conference and Exhibition; Mar. 9, 2015; 6 Pages.

U.S. Appl. No. 16/597,013, filed Oct. 9, 2019, Bush, et al.

Calma Company, "GDSII™ Stream Format Manual;" Documentation No. B97E060, Release 6.0; Feb. 1987; 47 Pages.

Chakraborty et al., "Hardware Trojan: Threats and Emerging Solutions;" IEEE International High Level Design Validation and Test Workshop (HLDVT); Nov. 4, 2009; 6 Pages.

Cocchi et al., "Circuit Camouflage Integration for Hardware IP Protection;" 2014 51st ACM/EDAC/IEEE Design Automation Conference (DAC); Jun. 1, 2014; 5 Pages.

Ellson et al., "Graphviz and Dynagraph—Static and Dynamic Graph Drawing Tools;" Graph Drawings Software; Part of the Mathematics and Visualization book series (MATHVISUAL); Jan. 2004; pp. 127-148; 23 Pages.

Elmore, "Transient Response of Damped Linear Network with Particular Regard to Wideband Amplifiers;" Journal of Applied Physics, vol. 19, No. 1; United States Atomic Energy Commission, Oak Ridge, Tennessee; Mar. 26, 1947; 24 Pages.

Forte, "Temperature Tracking: An Innovative Run-Time Approach for Hardware Trojan Detection;" 2013 IEEE/ACM International Conference on Computer-Aided Design (ICCAD); Nov. 18, 2013; 7 Pages.

Github, https://github.com/mit-ll/CEP Webpage accessed and printed on Oct. 7, 2019; Common Evaluation Platform; 1 page.

Github, https://github.com/openrisc/or1200 Webpage accessed and printed on Oct. 7, 2019; Common Evaluation Platform; 1 Page.

Goldstein et al., "Scoap: Sandia Controllability/Observability Analysis Program;" Proceedings of the 17th ACM Design Automation Conference (DAC); Jun. 23, 1980; 7 Pages.

Hicks et al., "Overcoming an Untrusted Computing Base: Detecting and Removing Malicious Hardware Automatically;" Proceedings of the 31st IEEE Symposium on Security & Privacy; May 2010; 14 Pages.

Hicks, et al., "SPECS: A Lightweight Runtime Mechanism for Protecting Software from Security-Critical Processor Bugs;" Inter-

(56) References Cited

OTHER PUBLICATIONS national Conference on Architectural Support for Programming Languages and Operating Systems (ASPLOS); Mar. 14, 2015; p. 517-529; 13 Pages.
Hughes et al., "Computer Graphics: Principles and Practice;" Third Edition; Pearson Education; Jul. 2013; 184 Pages.
IEEE Computer Society, "IEEE Standard Verilog® Hardware Description Language;" IEEE Standards (IEEE Std 1364-2001); Sep. 28, 2001; 791 Pages.
Intel Corporation, "Microprocessor Quick Reference Guide;" Retrieved from https://www.intel.com/pressroom/kits/quickreffam.htm on May 10, 2019; 32 Pages.
Jin et al., "DFTT: Design for Trojan Test;" IEEE International Conference on Electronics, Circuits, and Systems (ICECS); Dec. 12, 2010; 6 Pages.
Jin et al., "Hardware Trojan Detection Using Path Delay Fingerprint" 2008 IEEE International Workshop on Hardware-Oriented Security and Trust; Jun. 9, 2008; 7 Pages.
King et al., "Designing and Implementing Malicious Hardware," Proceedings of the Usenix Workshop on Large-Scale Exploits and Emergent Threats (LEET); Apr. 15, 2008; 8 Pages.
Kumar et al., "Parametric Trojans for Fault-Injection Attacks on Cryptographic Hardware;" Workshop on Fault Diagnosis and Tolerance in Cryptography (FDTC); Sep. 23, 2014; 11 Pages.
Li et al., "At-Speed Delay Characterization for IC Authentication and Trojan Horse Detection;" 2008 IEEE International Workshop on Hardware-Oriented Security and Trust; Jun. 9, 2008; 7 pages.
Lin et al., "Trojan Side-Channels: Lightweight Hardware Trojans through Side-Channel Engineering;" International Workshop on Cryptographic Hardware and Embedded Systems (CHES); Sep. 2009; 14 Pages.
Narasimhan et al., "TeSR: A Robust Temporal Self-Referencing Approach for Hardware Trojan Detection;" IEEE International Symposium on Hardware-Oriented Security and Trust (HOST); Jun. 5, 2011; 4 Pages.
Potkonjak et al., "Hardware Trojan Horse Detection Using Gate-Level Characterization;" 2009 46th ACM/IEEE Design Automation Conference; Jul. 26, 2009; 6 Pages.
Pypy, "PyPy;" Retrieved from https://pypy.org/ on May 14, 2019; 13 Pages.
Robertson et al., "The Big Hack: How China Used a Tiny Chip to Infiltrate U.S. Companies;" Bloomberg Businessweek; Oct. 4, 2018; 25 Pages.
Rostami et al., "Hardware Security: Threat Models and Metrics;" IEEE/ACM International Conference on Computer-Aided Design (ICCAD); Nov. 18, 2013; 5 Pages.
Salmani et al., "Analyzing Circuit Vulnerability to Hardware Trojan Insertion at the Behavioral Level;" 2013 IEEE International Symposium on Defect and Fault Tolerance in VLSI and Nanotechnology Systems (DFTS); Oct. 2, 2013; 6 Pages.
Salmani, "COTD: Reference-Free Hardware Trojan Detection and Recovery Based on Controllability and Observability in Gate-Level Netlist;" IEEE Transactions on Information Forensics and Security (vol. 12, Issue: 2); Feb. 2017; 13 Pages.
Salmani et al., "On Design Vulnerability Analysis and Trust Benchmarks Development;" $31^{st}$ IEEE International Conference on Computer Design (ICCD); Oct. 6, 2013; 4 Pages.
Shiyanovskii et al., "Process Reliability Based on Trojans through NBTI and HCI effects;" 2010 NASA/ESA Conference on Adaptive Hardware and Systems; Jun. 15, 2010; 8 Pages.
Solid State Technology, "Why Node Shrinks are No Longer Offsetting Equipment Costs;" Retrieved from https://electoiq.com/2012/10/why-node-shrinks-are-no-longer-offsetting-equipment-costs/; Blog from Oct. 24, 2012; 4 Pages.
Tehranipoor et al., "A Survey of Hardware Trojan Taxonomy and Detection;" IEEE Design & Test of Computers, vol. 27, Issue 1; Feb. 5, 2010; 16 Pages.
Trippel et al., "An Extensible Framework for Quantifying the Coverage of Defenses Against Untrusted Foundries;" https://arxiv.org/abs/1906.08836; Jun. 20, 2019; 17 Pages.
Waksman et al., "FANCI: Identification of Stealthy Malicious Logic Using Boolean Functional Analysis;" Proceedings of the ACM SIGSAC Conference on Computer & Communication Security (CCS); Nov. 4, 2013; 12 Pages.
Wang et al., "Detecting Malicious Inclusions in Secure Hardware: Challenges and Solutions;" IEEE International Workshop on Hardware-Oriented Security and Trust (HOST); Jul. 2008; 8 Pages.
Weiler et al., "Hidden Surface Removal Using Polygon Area Sorting;" SIGGRAPH '77 Proceedings of the 4th Annual Conference on Computer Graphics and Interactive Techniques; Jul. 20, 1977; 9 Pages.
Williams, "Icarus Verilog;" Retrieved from http://iverilog.icarus.com/ on May 10, 2019; 3 Pages.
Wolff et al., "Towards Trojan-Free Trusted ICs: Problem Analysis and Detection Scheme;" Proceedings of the ACM Conference on Design, Automation and Test in Europe; Mar. 10, 2008; 4 Pages.
Xiao et al., "BISA: Built-In Self-Authentication for Preventing Hardware Trojan Insertion" 2013 IEEE International Symposium on Hardware-Oriented Security and Trust (HOST), Jun. 2, 2013; 6 Pages.
Yang et al., "A2: Analog Malicious Hardware;" IEEE Symposium on Security and Privacy (SP); May 22, 2016; 20 Pages.
Zhang et al., "VeriTrust: Verification for Hardware Trust;" $50^{th}$ ACM/EDAC/IEEE Design Automation Conference (DAC); May 29, 2013; 8 Pages.
Zhou et al., "Detecting Hardware Trojans Using Backside Optical Imaging of Embedded Watermarks;" Proceedings of $52^{nd}$ ACM/EDAC/IEEE Design Automation Conference (DAC); Jun. 7, 2015; 6 Pages.
PCT International Search Report and Written Opinion dated Jan. 3, 2020 for International Application No. PCT/US2019/058254; 12 Pages.
PCT International Search Report and Written Opinion dated Jan. 15, 2020 for International Application No. PCT/US2019/058255; 16 Pages.
PCT International Search Report and Written Opinion dated Jan. 3, 2020 for International Application No. PCT/US2019/058254; 11 Pages.

\* cited by examiner

DEFENSIVE ROUTING AND RELATED TECHNIQUES

CROSS-REFERENCE TO RELATED APPLICATIONS

This application claims the benefit of and priority to U.S. Provisional Application No. 62/767,288, filed on Nov. 14, 2018, U.S. Provisional Application No. 62/792,012, filed on Jan. 14, 2019, and U.S. Provisional Application No. 62/801,698, filed on Feb. 6, 2019, each of which is herein incorporated by reference in its entirety.

STATEMENT REGARDING FEDERALLY SPONSORED RESEARCH

This invention was made with Government support under Grant No. FA8702-15-D-0001 awarded by the U.S. Air Force. The Government has certain rights in the invention.

FIELD

This disclosure relates generally to integrated circuit (IC) fabrication, and more particularly, to an IC structure and technique for preventing manipulations in an IC.

BACKGROUND

Since the inception of the integrated circuit (IC), the transistors and wires used to construct them have continued to shrink. While this shrinkage improves performance and density, it reduces trust. For example, the cost to build leading-edge integrated circuit (IC) fabrication facilities has skyrocketed, forcing even nation states to outsource the fabrication of high-performance ICs. However, outsourcing IC fabrication presents security threats including unauthorized fabrication-time modifications (sometimes referred to as "hardware trojans").

Post-fabrication detection techniques have been developed as one solution to defend against fabrication-time attacks. Post-fabrication detection techniques attempt to detect the presence of hardware trojan components through various means after the chip has been fabricated. Such detection techniques consist primarily of side-channel analysis and functional testing. Side-channel analysis attempts to detect noticeable deviations in power usage, electromagnetic (EM) emanations, performance (timing), etc. It often requires a "golden" reference chip to be effective and can only detect the side-channel signature deviations greater than those caused by process variation (i.e., the hardware Trojan must have a large physical footprint). Functional testing attempts to inadvertently trigger the hardware trojan by activating as many logic paths through the circuit as possible. While functional testing does not require any "golden" reference chip, it requires the trojan's trigger to be activated by the IC's common mode operation, as exhaustive testing of even a moderately complex IC is infeasible.

With the aforementioned limitations of post-fabrication detection approaches, pre-fabrication prevention techniques have been developed as another solution to defend against fabrication-time attacks. Pre-fabrication detection techniques attempt to alter an IC's physical layout, at design time, in a way that makes it challenging for a foundry-side adversary or attacker to modify. Such prevention techniques are typically placement-centric in that they attempt to limit the amount of open space on an IC's device layer by filling open spaces with interconnected functional logic gates. In this way, pre-fabrication prevention techniques make it more challenging for an adversary to find open space in the design to insert hardware trojan logic gates at fabrication time. However, there are several problems with placement-centric approaches. For example, the density of IC layouts is typically set to 60-70% density to ensure routability. Moreover, if 100% or near 100% density were possible, every IC would be designed and manufactured that way to save cost.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

The concepts, systems and techniques described herein relate to defensive routing of guard wires for security-critical wires in an integrated circuit (IC). Defensive routing provides a routing-centric and preventive layout-level defense against IC fabrication time attacks against security-critical wires within an IC.

In accordance with one example embodiment provided to illustrate the broader concepts, systems, and techniques described herein, a method may include identifying at least one security-critical wire in an IC design, identifying at least one unblocked surface of the identified at least one security-critical wire, and guarding the identified at least one surface of the identified at least one security-critical wire with a guard wire.

In one aspect, the guard wire may be a natural guard wire.

In one aspect, the guard wire may be a synthetic guard wire.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

Figure 1:
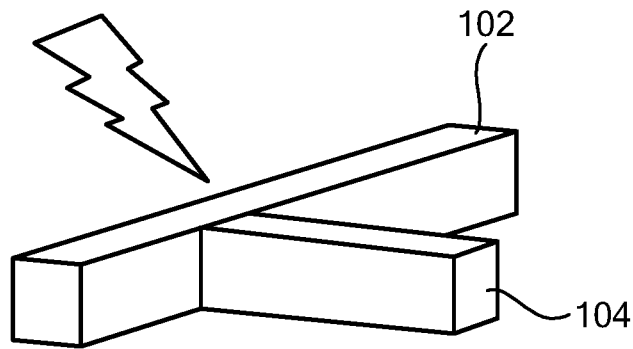
FIG. 1 illustrates an example security-critical wire segment in an IC design without defensive routing.

Techniques are disclosed for defensive routing of guard wires for security-critical wires in an integrated circuit (IC). Defensive routing provides a routing-centric and preventive layout-level defense against IC fabrication time attacks against security-critical wires or so-called security-critical interconnects within an IC. Given a security-critical wire in an IC to protect, defensive routing shields the security-critical wire with guard wires. Such guard wires shield the surfaces of the security-critical wire, thus creating an obstacle for adversaries to overcome. Defensive routing for the security-critical wire can be deployed during the place-and-route (PaR) design phase (or so-called physical or layout level) of an IC design workflow. Shielding a security-critical wire with guard wires prevents rogue wires, such as hardware trojan wires, from being connected or otherwise attached to the shielded security-critical wire during fabrication of the IC.

As noted above, both post-fabrication detection and pre-fabrication prevention are ineffective at detecting/preventing fabrication time attacks, such as the insertion of hardware trojans, to an IC. Post-fabrication prevention attempts to detect the presence of hardware trojan components through various techniques after the chip has been fabricated. Pre-fabrication prevention attempts to alter an IC's physical layout, at design time, in a way that makes it difficult to modify the design of the IC during fabrication.

Thus, and in accordance with certain of the embodiments disclosed herein, defensive routing techniques are provided that prevent the attachment of attack logic, such as hardware trojan wires, to security-critical wires in an IC. As will be appreciated in light of this disclosure, defensive routing refers generally to any routing technique that protects a security-critical wire from fabrication time alterations. Specifically, guard wires are routed around (e.g., routed about) a security-critical wire to make it difficult and, in some cases, effectively infeasible, for an adversary to tap the security-critical wire without detection. In this manner, defensive routing is targeted and, thus, does not require filling the empty space in an IC design to be effective. As used herein, the term "security-critical wire" refers to a wire within an IC design that is likely to be a target of an IC fabrication time attack, such as by a hardware trojan or other malicious modification to the circuitry of the IC. For example, a security-critical wire is a wire within the IC to which a rogue hardware trojan wire would likely be attached. In some example cases, a security-critical wire connects or operatively couples security-critical components in the IC.

In some embodiments, natural guard wires may be routed along-side security-critical wires in an IC. As used herein, the term "natural guard wires" refers to wires that are inherent to a host IC design (e.g., the design of a host IC that includes the wires), such as signal wires, that are routed nearby the security-critical wires. Such natural guard wires may create hyper-local routing densities nearby or approximate security-critical wires, thus limiting or effectively eliminating the locations on the security-critical wires where an adversary can attach rogue wires. By repurposing preexisting wires in the host IC design as guard wires, natural guard wires introduce no additional hardware overhead to the design of the IC. Note that natural guard wires may be inherently tamper-evident with respect to deletion (e.g., removal) and cut (e.g., being cut or broken) attacks. For example, an adversary may not be able to delete or significantly modify natural guard wires without risking alteration of the functionality and/or operating specifications of the host IC, and thus being exposed. Natural guard wires may also be reroute tamper-evident depending on routing constraints (e.g., length, layer, location, etc.), for example, if the natural guard wires are timing sensitive in the IC.

In some embodiments, synthetic guard wires may be routed along-side security-critical wires in an IC. As used herein, the term "synthetic guard wires" refer to wires that are not inherent to the host IC design (e.g., the functionality of the IC) that are routed nearby security-critical wires. In an embodiment, synthetic guard wires may be added to the IC design during the place-and-route IC design phase. Such synthetic guard wires reduce and, in some cases, effectively eliminate, the accessible surface area of security-critical wires available for attaching rogue wires. Note that use of synthetic guard wires may be relatively easier to deploy in an IC design since synthetic guard wires are not subject to additional routing as compared to natural guard wires. However, in some implementations, the synthetic guard wires may not be inherently tamper-evident. In some embodiments, the synthetic guard wires can be routed (e.g., connected) to I/O pins for connecting to a programmable fabric, such as a one-time programmable fabric, for post-fabrication off-chip tamper analysis. For example, a programmable fabric, such as a one-time programmable fabric, may be coupled to the I/O pins to perform continuity checks to detect deletion and/or cut attacks. Additionally or alternatively, fault-analysis techniques, such as time-domain reflectometry (TDR), may be used to verify the integrity the synthetic guard wire shape(s) (impedance profile) and/or length(s) (reflection time delay). In other embodiments, the synthetic guard wires can be connected to internal sensors or ring oscillators for on-chip tamper analysis to detect changes in synthetic guard wire lengths. In this manner, synthetic guard wires may be tamper-evident with respect to deletion, cut, and reroute attacks.

It is noted that designations such "above" or "below" or "top" or "bottom" or "side" or "north" or "south" or "east" or "west" are not intended to necessarily implicate a limitation as to orientation of the embodiments described herein. Rather, such terminology is simply used in a relative sense to consistently describe a structure as it exists in any one particular orientation and as illustrated herein.

Turning now to the figures, FIG. 1 illustrates an example security-critical wire segment in an IC design without defensive routing. Specifically, FIG. 1 shows an example security-critical wire segment 102 (also referred to herein as security-critical wire 102 for brevity) having an attached rogue wire 104. Rogue wire 104 may be a component of or otherwise associated with an additive hardware trojan. Additive hardware trojans require adding additional circuit components and wiring to an IC design. To successfully implement an additive hardware trojan, an adversary needs to complete both hardware trojan placement and hardware trojan routing, without being exposed. Namely, the adversary needs to 1) find empty space on the device layer of the IC to insert the additive hardware trojan's trigger and payload components (e.g., logic gates), and 2) locate an unblocked segment on a security-critical wire to route the additive hardware trojan components (e.g., the additive hardware trojan payload). Note that the risk of exposure prevents the adversary from modifying the dimensions of the IC chip and/or violating the IC manufacturing design rules. However, the adversary may move components and/or existing wiring in the IC design, provided such modifications do not alter the overall functionality of the IC design, or cause the IC design to deviate from its original operating specifications (e.g., timing and power). As can be seen in FIG. 1, security-critical wire 102 includes an unblocked segment to which the adversary can attach rogue wire 104, which routes to the additive hardware trojan components. For example, rogue wire 104 may route the additive hardware trojan payload to alter the functionality of the IC as desired by the adversary.

Figure 2:
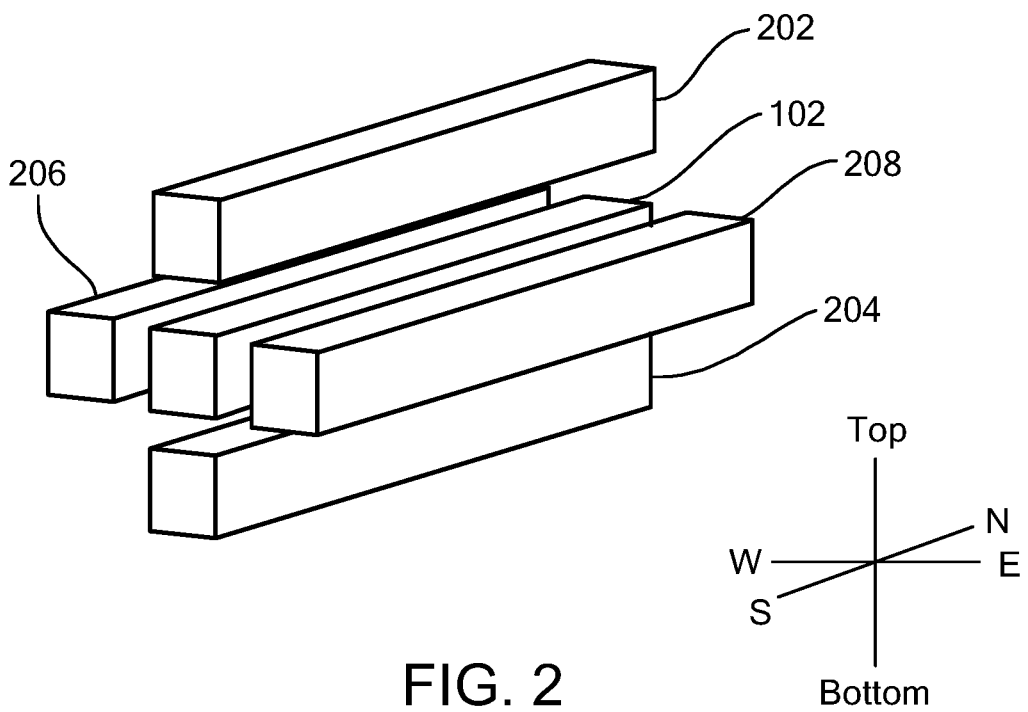
FIG. 2 illustrates the security-critical wire segment of FIG. 1 with defensive routing, in accordance with an embodiment of the present disclosure.

FIG. 2 illustrates the security-critical wire segment of FIG. 1 with defensive routing, in accordance with an embodiment of the present disclosure. As shown, guard wires 202, 204, 206, 208 may be routed around security-critical wire 102. Note that, in FIG. 2, same layer guard wire end caps, such as the end cap for guard wires 206, 208 in the same routing player of the IC, which may be present are not shown for clarity. Guard wires 202, 204, 206, 208 may shield security-critical wire 102 from fabrication time attacks. The guard wire endcaps (not shown) may shield the ends of security-critical wire 102. In other words, guard wires 202, 204, 206, 208 may make it difficult and, in some cases, effectively infeasible, for an adversary to attach a rogue wire without detection. In this sense, guard wires 202, 204, 206, 208 may be considered tamper evident with respect to alterations to guard wires 202, 204, 206, 208.

Figure 3A:
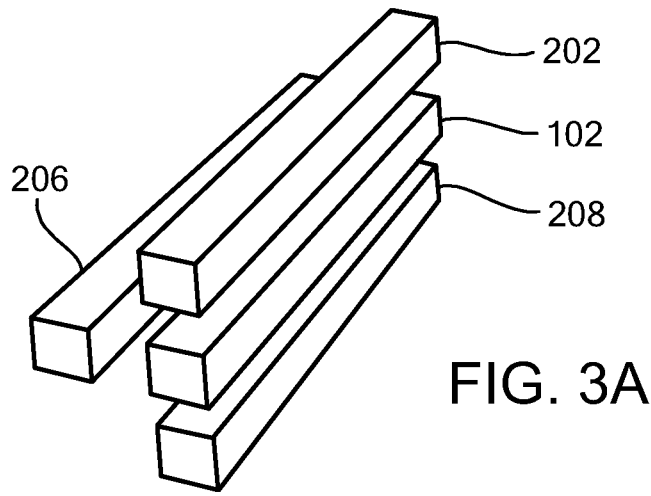
FIGS. 3A-3C illustrate example techniques to by-pass the guard wires of FIG. 2.
Figure 3B:
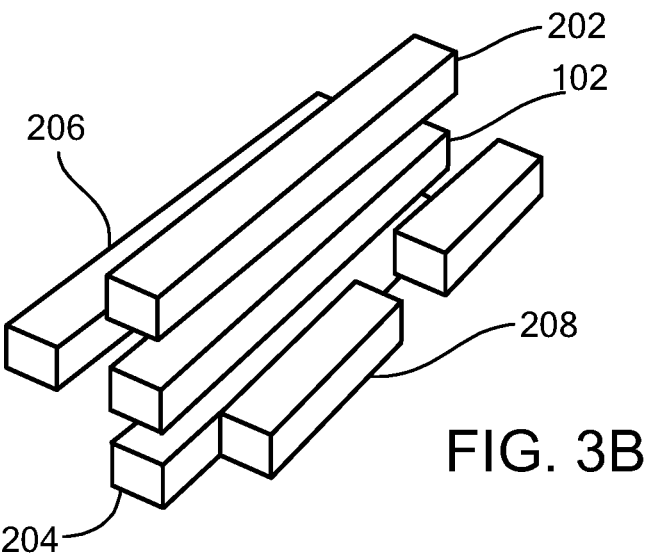
Figure 3C:
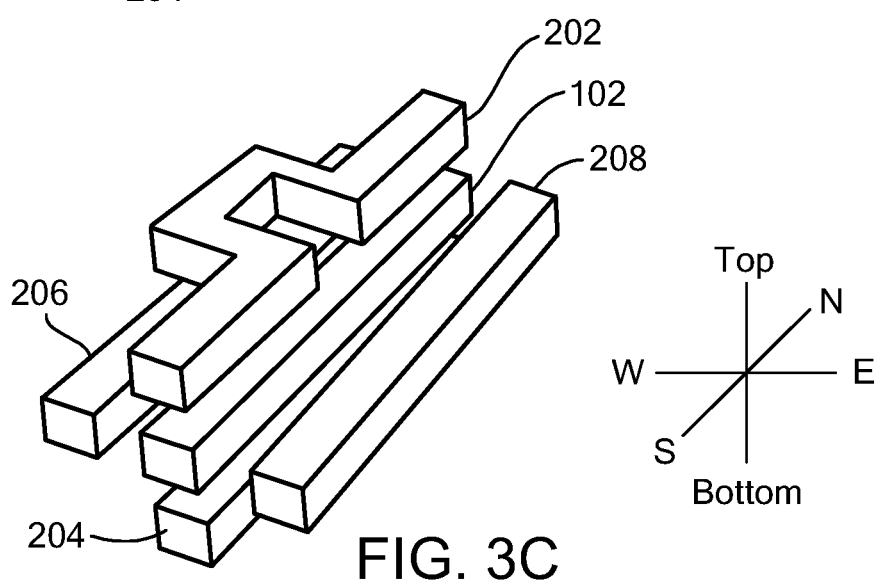

FIGS. 3A-3C illustrate example techniques to by-pass guard wires 202, 204, 206, 208 of FIG. 2. As noted previously, guard wires may shield the surfaces of a security-critical wire, thus creating an obstacle for an adversary to overcome in implementing an additive hardware trojan in the IC. As can be seen in FIG. 3A, in a deletion attack by an adversary, for example, a guard wire, such as guard wire 208, shielding an east side surface (sometimes referred to herein simply as a side surface) of security-critical wire 102 may be removed or otherwise deleted from the IC design. Once removed, the adversary may perform an additive hardware trojan routing by attaching a rogue wire to the east side surface of security-critical wire 102 exposed by the removal of guard wire 208. In this example case, since the removed guard wire 208 is in the same layer as security-critical wire 102 in the IC, the rogue wire may be directly attached to the east side surface of security-critical wire 102 exposed by the removal of guard wire 208. Note that any of the other guard wires 202, 204, 206 may be removed in a deletion attack. In the case where the deletion attack removes a guard wire in a layer adjacent to a layer that includes security-critical wire 102, such as an adjacent layer above or below the layer of security-critical wire 102, a via (e.g., a layer jumping connection) may be used to attach a rogue wire to a side surface of security-critical wire 102 exposed by the removal of guard wire. For example, if guard wire 202 in an adjacent layer above security-critical wire 102 is removed, a via may be used to attach the rogue wire to a top side surface of security-critical wire 102 exposed by the removal of guard wire 202. Similarly, if guard wire 204 in an adjacent layer below security-critical wire 102 is removed, a via may be used to attach the rogue wire to a bottom side surface of security-critical wire 102 exposed by the removal of guard wire 204.

As can be seen in FIG. 3B, in a cut attack by an adversary, for example, a part or portion of a guard wire, such as guard wire 208, shielding the east side surface of security-critical wire 102 may be removed or otherwise deleted from the IC design. Once removed, the adversary may perform an additive hardware trojan routing by attaching a rogue wire to the east side surface of security-critical wire 102 exposed by the removed part of guard wire 208. In this example case, since a part of guard wire 208 in the same layer as security-critical wire 102 in the IC is removed, the rogue wire may be directly attached to the east side surface of security-critical wire 102 exposed by the removed part of guard wire 208. Note that a part of any of the other guard wires 202, 204, 206 may be removed in a cut attack. In the case where the cut attack removes a part of a guard wire in a layer adjacent to a layer that includes security-critical wire 102, such as an adjacent layer above or below the layer of security-critical wire 102, a via may be used to attach a rogue wire to a side of security-critical wire 102 exposed by the removed part of the guard wire. For example, if a part of guard wire 202 in an adjacent layer above security-critical wire 102 is removed, a via may be used to attach the rogue wire to the top side surface of security-critical wire 102 exposed by the removed part of guard wire 202. Similarly, if a part of guard wire 204 in an adjacent layer below security-critical wire 102 is removed, a via may be used to attach the rogue wire to the bottom side surface of security-critical wire 102 exposed by the removed part of guard wire 204.

As can be seen in FIG. 3C, in a reroute attack by an adversary, for example, a part or portion of a guard wire, such as guard wire 202, shielding the top side surface of security-critical wire 102 may be rerouted such that the rerouted part of guard wire 202 no longer shields security-critical wire 102. In other words, the rerouted guard wire is left intact, but a part of the guard wire is rerouted or otherwise moved out of the way of a side surface of the security-critical wire. Once rerouted, the adversary may perform an additive hardware trojan routing by attaching a rogue wire to the top side surface of security-critical wire 102 exposed by the rerouted part of guard wire 202. For example, a via may be used to attach a rogue wire to the top side surface of security-critical wire 102 exposed by the rerouted part of guard wire 202. In the case where a reroute attack reroutes a part of guard wire 204, a via may be used to attach a rogue wire to the bottom side surface of security-critical wire 102 exposed by the rerouted part of guard wire 204. Note that guard wires in adjacent layers above or below a layer that includes security-critical wire 102 may be rerouted easier than guard wires in the same layer as security-critical wire 102. This is because the rerouting of a guard wire in an adjacent layer above or below security-critical wire 102 is or otherwise occurs within the same layer that includes the guard wire. For example, as can be seen in FIG. 3C, rerouting of a part of guard wire 202 an adjacent layer above security-critical wire 102 occurs within the layer of guard wire 202. Similarly, rerouting of a part of guard wire 204 an adjacent layer below security-critical wire 102 occurs within the layer of guard wire 204. However, although possible, rerouting of a part of a guard wire in the same layer as security-critical wire 102, such as guard wire 206 or guard wire 208, may require use of an adjacent layer to no longer shield a part of security-critical wire 102.

Figure 4A:
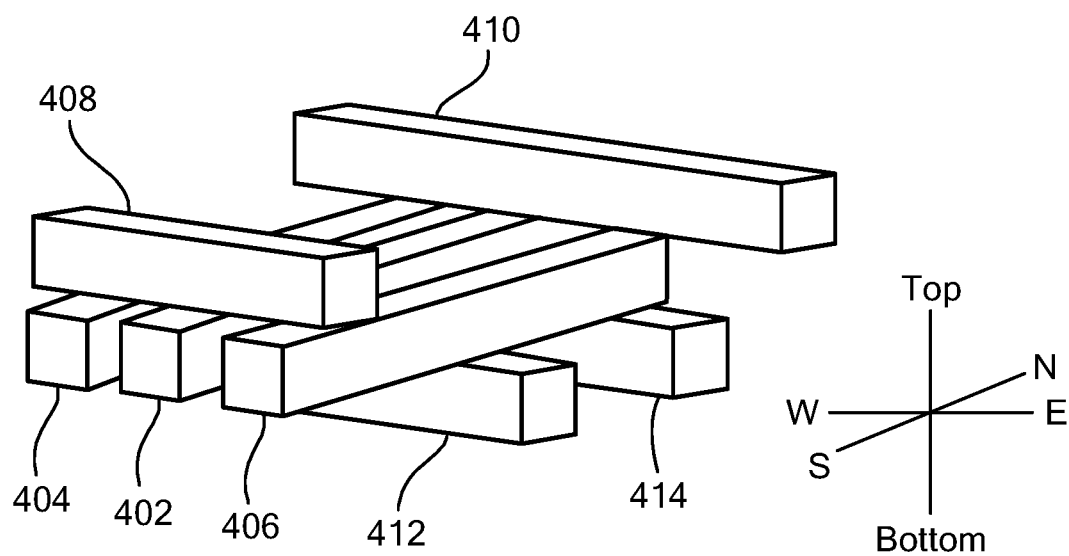
FIG. 4A illustrates example natural guard wires routed around a security-critical wire segment, in accordance with an embodiment of the present disclosure.

FIG. 4A illustrates example natural guard wires routed around a security-critical wire, in accordance with an embodiment of the present disclosure. As shown, natural guard wires 404, 406, 408, 410, 412, 414 may be routed around a security-critical wire 402. Note that FIG. 4A shows portions of natural guard wires 404, 406, 408, 410, 412, 414 and a portion of security-critical wire 402. In some embodiments, a natural guard wire, such as any of natural guard wires 404, 406, 408, 410, 412, 414, may be implemented using a wire that is inherent to the IC design that is vital to the functionality of the IC. In some embodiments, a natural guard wire, such as any of natural guard wires 404, 406, 408, 410, 412, 414, may be implemented using a wire that is inherent to the IC design that is vital to the functionality of the IC but not security-critical. In some embodiments, natural guard wires 404, 406, 408, 410, 412, 414, may be formed from distinct wires inherent to the host IC design. In certain embodiments, two or more of natural guard wires 404, 406, 408, 410, 412, 414, may be formed from a single (e.g., same) wire inherent to the host IC design. For example, natural guard wires 408, 410 may be connected such that natural guard wires 408, 410 are formed from the same wire.

In particular, as can be seen in FIG. 4A, natural guard wires 404, 406 are in the same layer as security-critical wire 402 and may extend in a direction (e.g., north-south direction) along the length of security-critical wire 402. In this manner, natural guard wires 404, 406 may shield the west and east side surfaces, respectfully, of security-critical wire 402. Natural guard wires 408, 410 are in an adjacent layer above a layer that includes security-critical wire 402 and may extend in a direction (e.g., east-west direction) that crosses portions of the top side surface of security-critical wire 402. In this manner, natural guard wires 408, 410 may shield portions of the top side surface of security-critical wire 402. Natural guard wires 412, 414 are in an adjacent layer below the layer that includes security-critical wire 402 and may extend in a direction (e.g., east-west direction) that crosses portions of the bottom side surface of security-critical wire 402. In this manner, natural guard wires 408, 410 may shield portions of the bottom side surface of security-critical wire 402. Note that a natural guard wire, such as natural guard wire 408, 410, 412, 414, that is in an adjacent layer above or below security-critical wire 402 may be routed to extend in a direction (e.g., north-south direction) along at least a portion of the length of security-critical wire 402, thus shielding at least a portion of the top side surface or a portion of the bottom side surface of security-critical wire 402. However, in some instances, as can be seen in FIG. 4A, a portion of security-critical wire 402 may not be shielded due to additional routing constraints (e.g., length, layer, location, and spacing) that may accompany or otherwise be associated with routing natural guard wires (e.g., wires inherent to the IC design) along-side security-critical wire 402.

Figure 4B:
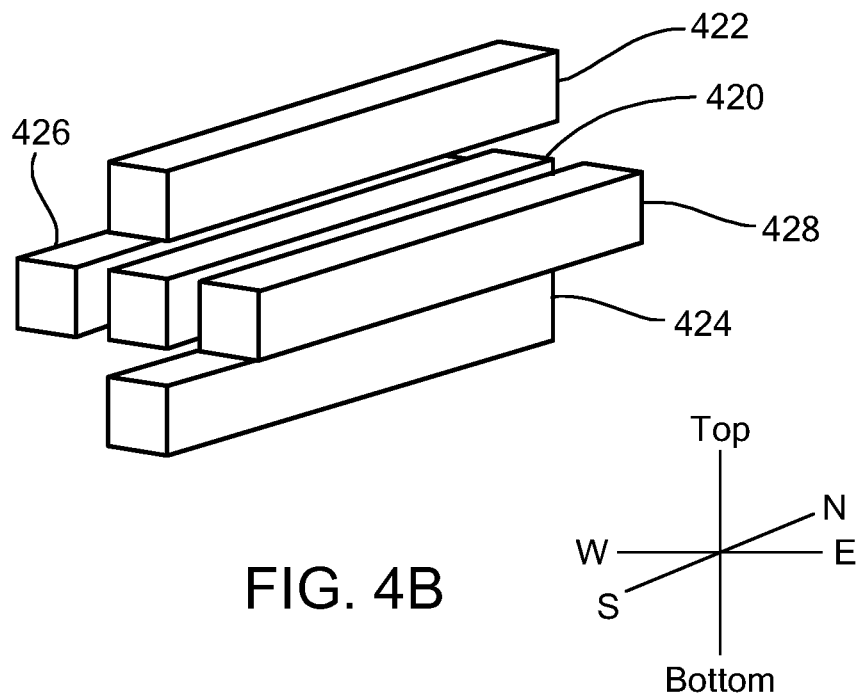
FIG. 4B illustrates example synthetic guard wires routed around a security-critical wire segment, in accordance with an embodiment of the present disclosure.

FIG. 4B illustrates example synthetic guard wires routed around a security-critical wire segment, in accordance with an embodiment of the present disclosure. As shown, synthetic guard wires 422, 424, 426, 448 may be routed along-side a security-critical wire 420. Note that FIG. 4B shows portions of synthetic guard wires 422, 424, 426, 448 and a portion of security-critical wire 420. In particular, as can be seen in FIG. 4B, synthetic guard wires 426, 428 are in the same layer as security-critical wire 420 and may extend in a direction (e.g., north-south direction) along the length of security-critical wire 420. In this manner, synthetic guard wires 426, 428 may shield the west and east side surfaces, respectfully, of security-critical wire 420. Synthetic guard wire 422 is in an adjacent layer above a layer that includes security-critical wire 420 and may extend in a direction (e.g., north-south direction) along the length of security-critical wire 420. In this manner, synthetic guard wire 422 may shield the top side surface of security-critical wire 420. Synthetic guard wire 424 is in an adjacent layer below the layer that includes security-critical wire 420 and may extend in a direction (e.g., north-south direction) along the length of security-critical wire 420. In this manner, synthetic guard wire 424 may shield the bottom side surface of security-critical wire 420.

In one example implementation, synthetic guard wires 422, 424, 426, 448 may be fully disjoint. In the fully disjoint synthetic guard wire architecture, the synthetic guard wires 422, 424, 426, 448 routed along each side of security-critical wire 420 are not connected to one another. In another example implementation, synthetic guard wires 422, 424, 426, 448 may be partially connected. In the partially connected synthetic guard wire architecture, a single synthetic guard wire is routed (utilized) along multiple sides of the security-critical wire. For example, synthetic guard wires 426, 428 may be connected such that a single synthetic guard wire is routed along-side security-critical wire 420 to shield the north, west, and east side surfaces of security-critical wire 420 that are in the same layer as synthetic guard wires 426, 428. In another example, synthetic guard wires 426, 422, 428 may be connected such that a single synthetic guard wire is routed along-side security-critical wire 420 to shield the west, top, and east side surfaces of security-critical wire 420. In still another example implementation, synthetic guard wires 422, 424, 426, 448 may be fully connected. In the fully connected synthetic guard wire architecture, a single synthetic guard wire is routed (utilized) along all sides of the security-critical wire. For example, synthetic guard wires 426, 422, 428, 424 may be connected such that a single synthetic guard wire is routed along-side security-critical wire 420 to shield the north, south, east, west, top, and bottom side surfaces of security-critical wire 420. It will be appreciated in light of this disclosure that synthetic guard wires may be routed in a manner as to shield substantially all surfaces (e.g., north, south, east, west, top, and bottom) of the security-critical wires in a host IC design. This is possible because synthetic guard wires are not subject to routing constraints.

Figure 5:
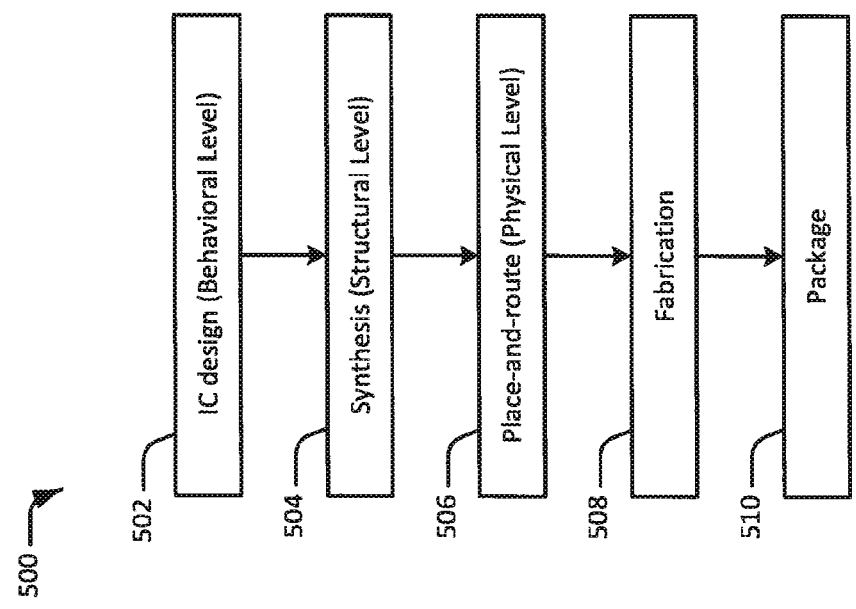
FIG. 5 is a flow diagram illustrating an example IC design process for designing an IC, in accordance with an embodiment of the present disclosure.

FIG. 5 is a flow diagram illustrating an example IC design process 500 for designing an IC, in accordance with an embodiment of the present disclosure. The embodiments disclosed herein, including process 500 and processes 600, 700, and 800 of FIGS. 6, 7, and 8, respectfully, further described below, can be implemented using and/or in various forms of hardware, software, firmware, and/or special purpose processors. For example, in one embodiment, a non-transitory computer readable medium has instructions encoded thereon that, when executed by one or more processors, cause one or more of the IC design methodologies described herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications that are tangibly embodied on a memory device, and that can be executed by a computer having any suitable architecture. In one embodiment, some of the operations of process 500 and processes 600, 700, and 800 of FIGS. 6, 7, and 8, respectfully, can be implemented, for example, using and/or as part of a Computer Aided Design (CAD) tool suitable for use in designing an IC. A computer system, such as a workstation, desktop computer, server, laptop, handheld computer, tablet computer (e.g., the iPad™ tablet computer), or other form of computing or telecommunications device that is capable of communication and that has sufficient processor power and memory capacity can then be used to execute the CAD tool and/or perform the operations described in this disclosure.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to process 500 of FIG. 5, at operation 502, high-level descriptions of an IC are written. In one example implementation, the high-level description can be written using a suitable Hardware Description Language (HDL), such as Verilog or Very High Speed Integrated Circuits HDL (VHDL), to name two examples.

At operation 504, the high-level descriptions of the IC are synthesized (e.g., compiled) into a gate-level netlist. The netlist may include information regarding the electronic components used in the IC, cells used, interconnections, area used, as well as other details. The netlist may also include information regarding the constraints that are applied to ensure that the design satisfies the desired performance specifications (e.g., required functionality, speed, etc.). In the example implementation of the high-level descriptions of the IC being written using HDL, the HDL code can be "compiled" into a gate-level netlist.

At operation 506, the gate-level netlist is placed-and-routed (PaR) onto a physical layout, such as for example a physical geometric blueprint, of the IC. In brief, the placement phase of PaR includes determining where to place all the electronic components, circuitry, and logic elements in the layout, and the routing phase of PaR includes determining the exact design of all the wires needed to connect the placed components, circuitry, and logic elements. In one example implementation, the layout of the IC can be encoded in a Graphics Database System II (GDSII) file. In accordance with at least some embodiments of the present disclosure, defensive routing in the IC may be deployed during the PaR design phase. The PaR sub-process is further described below with respect to FIG. 6.

At operation 508, a semiconductor device fabrication is performed to generate an IC die based on the layout of the IC (e.g., the layout encoded in a GDSII file). For example, in various embodiments, the IC including the defensive routing as variously described herein may be generated using the four main categories of the basic processing operations layering, patterning, doping, and heat treatment of one common IC fabrication scheme. It will be appreciated that other conventional IC fabrication schemes may be used to generate the IC including defensive routing.

At operation 510, the fabricated IC die is packaged or otherwise encapsulated in a supporting case that prevents physical damage and corrosion. The supporting case, which is also known as a "package", supports the electrical contacts which connect the device to a circuit board.

Figure 6:
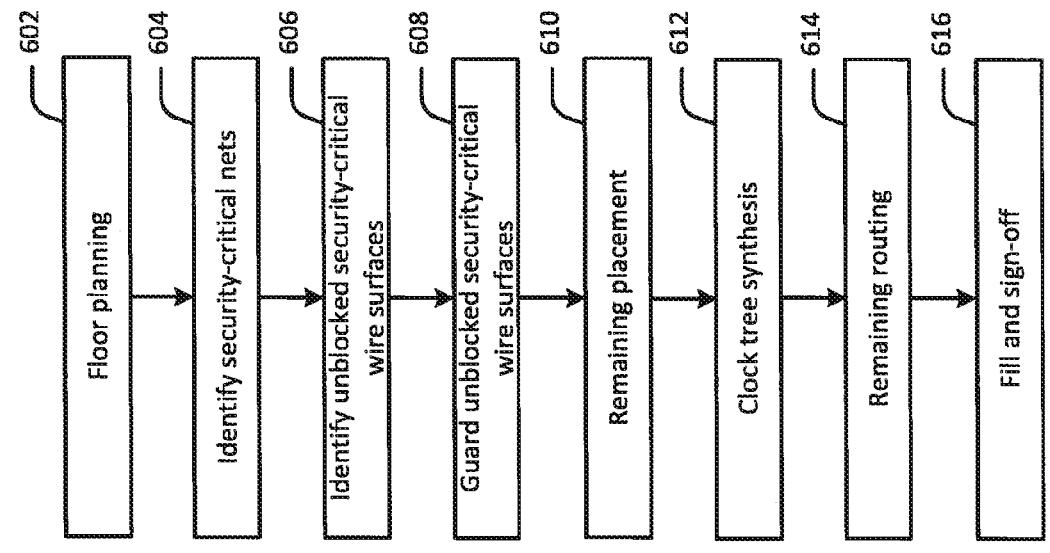
FIG. 6 is a flow diagram illustrating an example place-and-route (PaR) sub-process of the IC design process of FIG. 5, in accordance with an embodiment of the present disclosure.

FIG. 6 is a flow diagram illustrating an example place-and-route (PaR) sub-process 600 of the IC design process of FIG. 5, in accordance with an embodiment of the present disclosure. In brief, process 600 implements a defensive routing toolchain to place security-critical components and route security-critical wires and guard wires (i.e., natural guard wires and/or synthetic guard wires). The toolchain may identify or mark the locations of these security critical components, security-critical wires, and guard wires to prevent changes to or movement of these positions during subsequent place and route operations.

At operation 602, floor planning is performed to create a schematic representation of the tentative placement of the major functional blocks of the IC. For example, an IC floor plan may be generated that includes a core area and an input/output (I/O) pad ring surrounding the chip core area. The core area may include a placement grid, and circuit components may be placed and routed within the placement grid. Power and ground trees may be routed to provide power and/or ground rails to placement sites in the core area. The placement and routing may be optimized to adhere to design and performance objectives.

At operation 604, security-critical nets in the IC design are identified. A security-critical net includes at least one wire that is to be guarded. In an embodiment, the signals that are to be treated as security-critical may be flagged or otherwise identified by the IC designer. For example, IC designer may annotate the HDL to flag the security-critical signals by appending a designator, such as a unique prefix, to such signal names (e.g., names of the security-critical signals). In some embodiments, a circuit-level dataflow analysis may be performed to generate signal fan-in graphs from or otherwise based on the annotated HDL. For example, in one implementation, a netlist, such as a Verilog netlist, and the root signal annotations (e.g., flagged security-critical signals) can be input to the CAD tool, which generates a graph that details the signal(s) that comprise the fan-in to the input root signals. In an embodiment, the generated graph may detail the fan-in to a specified depth, such as, a depth of two stages of logic, three stages of logic, four stages of logic, five stages of logic, or any other desired depth.

In some embodiments, the set of signals deemed "security-critical" may be widened beyond the scope of the annotated root security-critical signals. For example, suppose a set of one or more wires are annotated as being root security-critical signals, and that a fan-in analysis to a depth of three stages of logic is performed. In this case, the signals (wires) that are encountered in this fan-in analysis (e.g., a fan-in analysis to a depth of three stages of logic) may be added to the set of security-critical signals. In this manner, the scope of the signals deemed to be security-critical may be widened beyond the annotated root security-critical signals. Note that such widening (e.g., including wires beyond the wires associated with the annotated root security-critical signals) effectively prevents an adversary from targeting a wire that influences a root security-critical wire.

At operation 606, unblocked security-critical wire surfaces in the IC layout (e.g., physical IC layout) are identified. As noted previously, the unblocked security-critical wire surfaces are potential hardware trojan wire attachment locations. In some embodiments, unblocked security-critical wire surfaces may be identified using or otherwise based on a GDS2Score, which is an open-source framework for computing security metrics over an IC layout. The GDS2Score provides security metrics detailing the IC layout's fabrication-time attack surface based an IC layout (e.g., a GDSII file encoding an IC layout) and a security-critical signal graph (e.g., the results of operation 604 above). The GDS2Score provides a net blockage metric, a trigger space metric, and a route distance metric. Specifically, the net blockage metric reports or indicates the location of the security-critical wires within the layout, and the surfaces of each security-critical wire that are unblocked. Thus, the net blockage metric quantifies how accessible a given net is within the IC layout. In an embodiment, the GDS2Score and, in particular, the net blockage metric, may be computed subsequent to routing of the security-critical wires, such that the computed GDS2Score provides the locations of where to route the guard wires.

At operation 608, unblocked security-critical wire surfaces are guarded. In one example implementation, a script, such as a TCL script, may be generated that routes guard wires in the IC design based on the location of the security-critical wires and their unblocked sides (e.g., the GDS2Score net blockage metric). In some such implementations, the generated script may be integrated with the CAD tool to automatically route the guard wires. Depending on the type of guard wires being deployed in the IC design, natural guard wires, synthetic guard wires, or both natural and synthetic guard wires, different scripts may be generated to deploy the guard wires. Deploying natural guard wires is further described below with respect to FIG. 7. Deploying synthetic guard wires is further described below with respect to FIG. 8.

At operation 610, remaining placement is performed to place the remaining non-security-critical cells (e.g., standard cells such as logic gates) within the core area. In an embodiment, the non-security-critical standard cells may be placed within the placement grid in a manner that reduces and, in some cases, minimizes, routing wire lengths and power consumption, and increases performance.

At operation 612, clock tree synthesis is performed to route and connect the clock tree to all sequential components in the IC design. Clock tree synthesis may include generating a balanced clock tree in such a manner as to, for example, reduce the skew and latency, maintain symmetrical clock tree structure and to cover the necessary components (e.g., devices that require clocks, such as flip-flops) in the design.

At operation 614, remaining routing is performed to connect the non-security-critical components. For example, wires may be routed between the standard cells.

At operation 616, the remaining (e.g., empty) placement sites may be filled with filler capacitor cells to achieve device uniformity. This may improve manufacturability and provide distributed decoupling capacitors to improve switching performance. Timing, design rules, and other verification tests may be run to ensure the IC device functions properly under the desired performance and operating margins.

Figures 7, 8:
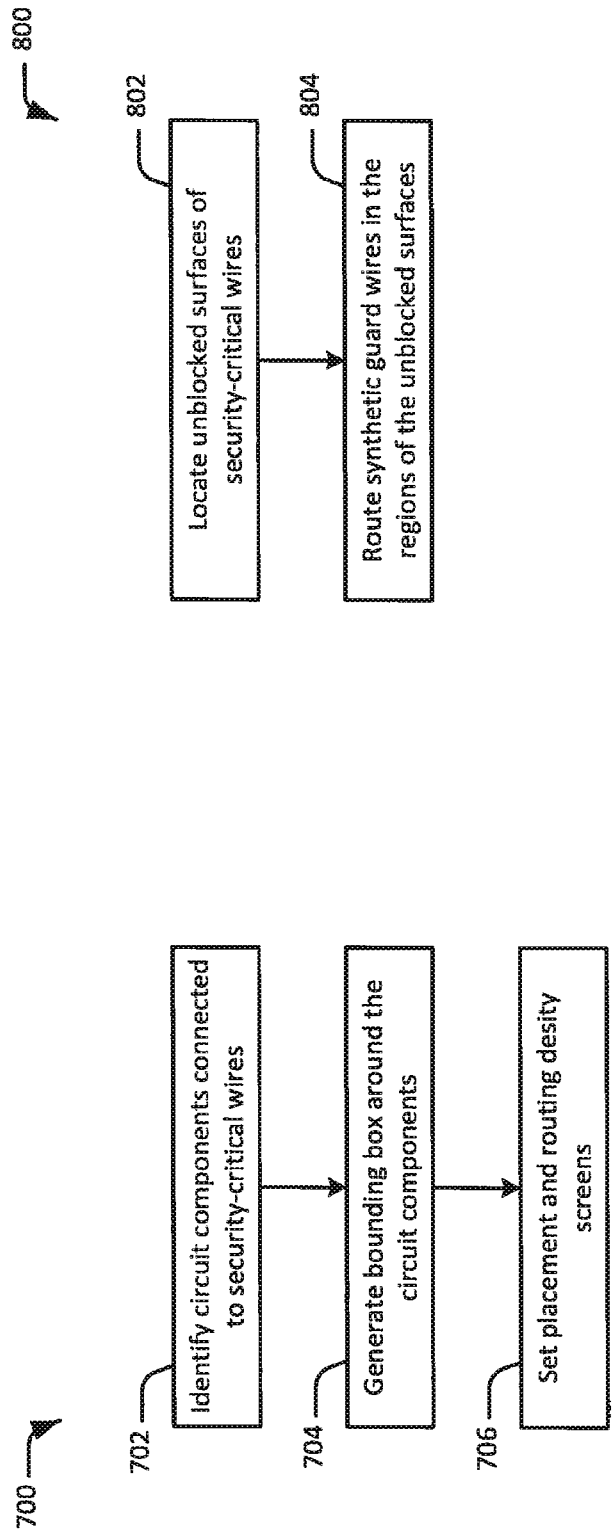
FIG. 7 is a flow diagram illustrating an example natural guard wire deployment process, in accordance with an embodiment of the present disclosure.
FIG. 8 is a flow diagram illustrating an example synthetic guard wire deployment process, in accordance with an embodiment of the present disclosure.

FIG. 7 is a flow diagram illustrating an example natural guard wire deployment process 700, in accordance with an embodiment of the present disclosure. In brief, natural guard wires are deployed (implemented) by constraining placement and routing resources nearby security-critical wires. To this end, at operation 702, circuit components (i.e., logic gates) connected to the security-critical wires (i.e., security-critical components) are identified. In one specific implementation, all circuit components connected to all security-critical wires may be identified.

At operation 704, a bounding box is drawn or otherwise generated around the identified circuit components. In some cases, respective bounding boxes may be generated around multiple identified circuit components. For example, a first bounding box may be generated around a first identified circuit component(s), and a second bounding box may be generated around a second identified circuit component(s). In one example implementation, the boundary of bounding box may be extended by a desired amount. For example, the boundary may be extended vertically by about 8%, 10%, 12%, or any suitable percentage value, of the overall bounding box height. Additionally or alternatively, the boundary may be extended horizontally by about 8%, 10%, 12%, or any suitable percentage value, of the overall bounding box width. These percentage values may be configurable and specified by, for example, the IC designer.

At operation 706, placement and routing density screens are set in a portion of the IC layout that lies outside of the security-critical bounding box (i.e., the bounding box generated, and possibly extended, around the identified circuit components). The placement and routing density screens are constraints that limit the placement and routing of resources (e.g., components and wiring) outside the security-critical bounding box. Such density screens (constraints) cause more components and wiring to me placed or located within the security-critical bounding box, which results in increased density (e.g., routing density) nearby security critical wires within the security-critical bounding box. With the increased routing density nearby the security-critical wires, the security-critical wires are less accessible by rogue wires, such as trojan payload delivery wires. The density screen configuration settings may be configurable to increase and, in some cases, maximize, the net blockage metric computed by the GDS2Score metric. Note that increasing the net-blockage metric may increase the difficulty for an attacker to find or otherwise locate an accessible location on a security-critical wire to attach a rogue (trojan) wire.

FIG. 8 is a flow diagram illustrating an example synthetic guard wire deployment process 800, in accordance with an embodiment of the present disclosure. At operation 802, unblocked surfaces (e.g., north, south, east, west, top, and/or bottom) of security-critical wires are identified. In one specific implementation, all unblocked surfaces of all security-critical wires may be identified. At operation 804, synthetic guard wires are routed in the regions of the identified unblocked surfaces. The synthetic guard wires may be routed such that the synthetic guard wires shield the identified unblocked surfaces. In some embodiments, the synthetic guard wires may be connected as appropriate to deploy a partially connected synthetic guard wire architecture. In other embodiments, the synthetic guard wires may be connected as appropriate to deploy a fully connected synthetic guard wire architecture.

Figure 9:
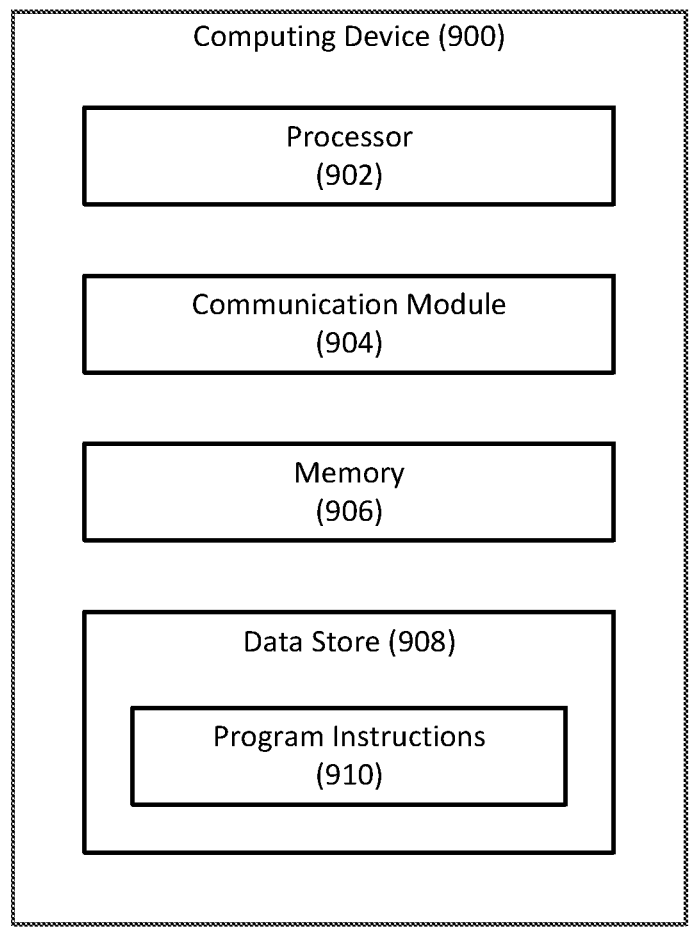
FIG. 9 illustrates selected components of an example computing device that may be used to perform any of the techniques as variously described in the present disclosure, in accordance with an embodiment of the present disclosure.

FIG. 9 illustrates selected components of an example computing device 900 that may be used to perform any of the techniques as variously described in the present disclosure, in accordance with an embodiment of the present disclosure. In some embodiments, computing device 900 may be configured to implement or direct one or more operations associated with some or all of the components and/or modules of a CAD tool suitable or otherwise configured to perform IC design process 500 and processes 600, 700, and 800. For example, such CAD tools may be implemented in and/or using computing device 900. In one example case, for instance, such CAD tools may be stored on a data store 908, loaded in memory 906, and executable by a processor 902.

In some embodiments, computing device 900 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. In some embodiments, a distributed computational system may be provided comprising multiple of such computing devices. As shown in FIG. 9, computing device 900 includes processor 902, a communication module 904, memory 906, and data store 908. Processor 902, communication module 904, memory 906, and data store 908 may be communicatively coupled. In various embodiments, additional components (not illustrated, such as a display, communication interface, input/output interface, etc.) or a subset of the illustrated components can be employed without deviating from the scope of the present disclosure.

Processor 902 may be designed to control the operations of the various other components of computing device 900. Processor 902 may include any processing unit suitable for use in computing device 900, such as a single core or multi-core processor. In general, processor 902 may include any suitable special-purpose or general-purpose computer, computing entity, or computing or processing device including various computer hardware, or firmware, and may be configured to execute instructions, such as program instructions, stored on any applicable computer-readable storage media. For example, processor 902 may include a microprocessor, a central processing unit (CPU), a microcontroller, a digital signal processor (DSP), an application-specific integrated circuit (ASIC), a Field-Programmable Gate Array (FPGA), Complex Instruction Set Computer (CISC), Reduced Instruction Set Computer (RISC), multi core, or any other digital or analog circuitry configured to interpret and/or to execute program instructions and/or to process data, whether loaded from memory or implemented directly in hardware. Although illustrated as a single processor in FIG. 9, processor 902 may include any number of processors and/or processor cores configured to, individually or collectively, perform or direct performance of any number of operations described in the present disclosure.

In some embodiments, processor 902 may be configured to interpret and/or execute program instructions and/or process data stored in memory 906, data store 908, or memory 906 and data store 908. In some embodiments, processor 902 may fetch program instructions from data store 908 and load the program instructions in memory 906. After the program instructions are loaded into memory 906, processor 902 may execute the program instructions.

For example, in some embodiments, any one or more of the components and/or modules of the CAD tool suitable or otherwise configured to perform IC design process 500 or any of the other embodiments and/or examples described herein may be included in data store 908 as program instructions 910. For example, in such embodiments, program instructions 910 cause computing device 900 to implement functionality in accordance with the various embodiments and/or examples described herein. Processor 902 may fetch some or all of program instructions 910 from data store 908 and may load the fetched program instructions 910 in memory 906. Subsequent to loading the fetched program instructions 910 into memory 908, processor 902 may execute program instructions 910 such that the CAD tool runs on computing device 900 as variously described herein.

In some embodiments, virtualization may be employed in computing device 900 so that infrastructure and resources in computing device 900 may be shared dynamically. For example, a virtual machine may be provided to handle a process running on multiple processors so that the process appears to be using only one computing resource rather than multiple computing resources. Multiple virtual machines may also be used with one processor.

Communication module 904 can be any appropriate network chip or chipset which allows for wired or wireless communication via a network, such as, by way of example, a local area network (e.g., a home-based or office network), a wide area network (e.g., the Internet), a peer-to-peer network (e.g., a Bluetooth connection), or a combination of such networks, whether public, private, or both. Communication module 904 can also be configured to provide intra-device communications via a bus or an interconnect.

Memory 906 may include computer-readable storage media configured for carrying or having computer-executable instructions or data structures stored thereon. Such computer-readable storage media may include any available media that may be accessed by a general-purpose or special-purpose computer, such as processor 902. By way of example, and not limitation, such computer-readable storage media may include non-transitory computer-readable storage media including Random Access Memory (RAM), Dynamic Random Access Memory (DRAM), Synchronized Dynamic Random Access Memory (SDRAM), Static Random Access Memory (SRAM), non-volatile memory (NVM), or any other suitable storage medium which may be used to carry or store particular program code in the form of computer-executable instructions or data structures and which may be accessed by a general-purpose or special-purpose computer. Combinations of the above may also be included within the scope of computer-readable storage media.

Data store 908 may include any type of computer-readable storage media configured for short-term or long-term storage of data. By way of example, and not limitation, such computer-readable storage media may include a hard drive, solid-state drive, Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), non-volatile memory (NVM), or any other storage medium, including those provided above in conjunction with memory 906, which may be used to carry or store particular program code in the form of computer-readable and computer-executable instructions, software or data structures for implementing the various embodiments as disclosed herein and which may be accessed by a general-purpose or special-purpose computer. Combinations of the above may also be included within the scope of computer-readable storage media. Computer-executable instructions may include, for example, instructions and data configured to cause processor 902 to perform a certain operation or group of operations. Data store 908 may be provided on computing device 900 or provided separately or remotely from computing device 900.

The following examples pertain to further embodiments, from which numerous permutations and configurations will be apparent.

Example 1 includes a method for forming an integrated circuit (IC) structure, the method including: identifying at least one security-critical wire in an IC design; identifying at least one unblocked surface of the identified at least one security-critical wire; and guarding the identified at least one surface of the identified at least one security-critical wire with a guard wire.

Example 2 includes the subject matter of Example 1, wherein the at least one unblocked surface of the identified at least one security-critical wire is identified based on a net blockage metric associated with a GDS2Score.

Example 3 includes the subject matter of any of Examples 1 and 2, wherein the guard wire is in an adjacent layer above or below a layer that includes the identified at least one security-critical wire.

Example 4 includes the subject matter of any of Examples 1 through 3, wherein the guard wire is a synthetic guard wire.

Example 5 includes the subject matter of Example 4, the method further including routing the synthetic guard wire to at least one input/output (I/O) pin for off-chip tamper analysis.

Example 6 includes the subject matter of Example 4, the method further including routing the synthetic guard wire to at least one internal sensor for on-chip tamper analysis.

Example 7 includes the subject matter of any of Examples 1 through 6, wherein guarding the identified at least one surface of the identified at least one security-critical wire with a guard wire includes repurposing a natural guard wire that is inherent to the IC design as the guard wire.

Example 8 includes the subject matter of Example 7, wherein the natural guard wire is a wire that is timing sensitive in the IC design.

Example 9 includes the subject matter of Example 7, wherein the natural guard wire is repurposed by constraining placement and routing resources nearby the identified at least one security-critical wire.

Example 10 includes the subject matter of Example 9, wherein constraining placement and routing resources includes setting placement and routing density screens outside of a security-critical bounding box, wherein the security-critical bounding box includes the identified at least one security-critical wire.

Example 11 includes an integrated circuit (IC) structure including: a layer including a security-critical wire; and at least one synthetic guard wire shielding at least one surface of the security-critical wire, wherein the at least one synthetic guard wire is not inherent to a host IC design of the IC structure.

Example 12 includes the subject matter of Example 11, wherein the least one synthetic guard wire is in a same layer as the security-critical wire.

Example 13 includes the subject matter of any of Examples 11 and 12, wherein the least one synthetic guard wire is in an adjacent layer above the layer including the security-critical wire.

Example 14 includes the subject matter of any of Examples 11 through 13, wherein the least one synthetic guard wire is in an adjacent layer below the layer including the security-critical wire.

Example 15 includes the subject matter of any of Examples 11 through 14, wherein the least one synthetic guard wire is connected to at least one input/output (I/O) pin for off-chip tamper analysis.

Example 16 includes the subject matter of any of Examples 11 through 15, wherein the least one synthetic guard wire is connected to at least one internal sensor for on-chip tamper analysis.

Example 17 includes the subject matter of any of Examples 11 through 16, wherein the least one synthetic guard wire is a synthetic guard wire in a plurality of synthetic guard wires, wherein the plurality of synthetic guard wires shield substantially all surfaces of the security-critical wire.

Example 18 includes the subject matter of any of Examples 11 through 17, wherein the security-critical wire is a first security-critical wire, the IC structure further including: a second security-critical wire; and at least one natural guard wire shielding at least one surface of the second security-critical wire, wherein the at least one natural guard wire is inherent to the host IC design of the IC structure.

Example 19 includes a method for forming an integrated circuit (IC) structure, the method including: identifying at least one security-critical net in an IC design, the at least one security-critical net including a security-critical wire; identifying at least one unblocked surface of the security-critical wire; and guarding the identified at least one surface of the identified security-critical wire with a guard wire.

Example 20 includes the subject matter of Example 19, wherein the guard wire is a synthetic guard wire, the synthetic guard wire being a wire that is not inherent to the IC design.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A method for forming an integrated circuit (IC) structure, the method comprising:

identifying at least one security-critical wire in an IC design;

identifying at least one unblocked surface of the identified at least one security-critical wire; and guarding the identified at least one surface of the identified at least one security-critical wire with a guard wire by repurposing a natural guard wire that is inherent to the IC design as the guard wire;

wherein the repurposing includes constraining placement and routing resources nearby the identified at least one security-critical wire.

2. The method of claim 1, wherein the at least one unblocked surface of the identified at least one security-critical wire is identified based on a net blockage metric associated with a GDS2Score.

3. The method of claim 1, wherein the guard wire is in an adjacent layer above or below a layer that includes the identified at least one security-critical wire.

4. The method of claim 1, further comprising routing the synthetic guard wire to at least one input/output (VO) pin for off-chip tamper analysis.

5. The method of claim 1, wherein the natural guard wire is a wire that is timing sensitive in the IC design.

6. The method of claim 1, wherein constraining placement and routing resources includes setting placement and routing density screens outside of a security-critical bounding box, wherein the security-critical bounding box includes the identified at least one security-critical wire.

7. An integrated circuit (IC) structure, comprising:
a layer including a security-critical wire; and
at least one synthetic guard wire shielding at least one surface of the security-critical wire, wherein the at least one synthetic guard wire is not inherent to a host IC design of the IC structure; and wherein the least one synthetic guard wire is in a same layer as the security-critical wire; and wherein the least one synthetic guard wire is connected to at least one internal sensor for on-chip tamper analysis.

8. The IC structure of claim 7, wherein the least one synthetic guard wire is in an adjacent layer above the layer including the security-critical wire.

9. The IC structure of claim 7, wherein the least one synthetic guard wire is in an adjacent layer below the layer including the security-critical wire.

10. The IC structure of claim 7, wherein the least one synthetic guard wire is connected to at least one input/output (VO) pin for off-chip tamper analysis.

11. The IC structure of claim 7, wherein the least one synthetic guard wire is a synthetic guard wire in a plurality of synthetic guard wires, wherein the plurality of synthetic guard wires shield substantially all surfaces of the security-critical wire.

12. The IC structure of claim 7, wherein the security-critical wire is a first security-critical wire, the IC structure further comprising:
a second security-critical wire; and
at least one natural guard wire shielding at least one surface of the second security-critical wire, wherein the at least one natural guard wire is inherent to the host IC design of the IC structure.

13. A method for forming an integrated circuit (IC) structure, the method comprising:
identifying at least one security-critical net in an IC design, the at least one security-critical net including a security-critical wire;
identifying at least one unblocked surface of the security-critical wire;
guarding the identified at least one surface of the identified security-critical wire with a synthetic guard wire; and
routing the synthetic guard wire to at least one internal sensor for on-chip tamper analysis.

14. The method of claim 13, wherein the synthetic guard wire being a wire that is not inherent to the IC design.

15. A method for forming an integrated circuit (IC) structure, the method comprising:
identifying at least one security-critical wire in an IC design;
identifying at least one unblocked surface of the identified at least one security-critical wire;
guarding the identified at least one surface of the identified at least one security-critical wire with a synthetic guard wire; and
routing the synthetic guard wire to at least one internal sensor for on-chip tamper analysis.

16. The method of claim 15, wherein the at least one unblocked surface of the identified at least one security-critical wire is identified based on a net blockage metric associated with a GDS2Score.

17. The method of claim 15, wherein the synthetic guard wire is in a same layer as the security-critical wire.

18. The method of claim 15, wherein the synthetic guard wire is in an adjacent layer above the layer including the security-critical wire.

19. The method of claim 15, wherein the synthetic guard wire is in an adjacent layer below the layer including the security-critical wire.

20. The method of claim 15, wherein the synthetic guard wire is a wire that is not inherent to the IC design.

* * * * *